(12) United States Patent
Belcher et al.

(10) Patent No.: US 7,918,190 B2
(45) Date of Patent: Apr. 5, 2011

(54) ELECTRONIC ANIMAL CONTAINMENT SYSTEM WITH DIRECTION OF APPROACH DETERMINATION

(75) Inventors: Donald K. Belcher, New Smyrna Beach, FL (US); Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 511 days.

(21) Appl. No.: 11/624,133

(22) Filed: Jan. 17, 2007

(65) Prior Publication Data

US 2008/0168949 A1    Jul. 17, 2008

(51) Int. Cl.
*A01K 15/04* (2006.01)
*A01K 15/00* (2006.01)

(52) U.S. Cl. ........................................ 119/721; 119/908

(58) Field of Classification Search .................. 119/721, 119/720, 859, 908; 340/573.3, 573.4; 367/139
See application file for complete search history.

(56) References Cited

U.S. PATENT DOCUMENTS

| | | | |
|---|---|---|---|
| 4,745,882 A | | 5/1988 | Yarnall, Sr. et al. |
| 5,794,569 A | | 8/1998 | Titus et al. |
| 5,852,403 A | * | 12/1998 | Boardman ............. 119/721 |
| 7,142,167 B2 | | 11/2006 | Rochelle et al. |
| 2001/0042522 A1 | * | 11/2001 | Barry et al. ............ 119/721 |

FOREIGN PATENT DOCUMENTS

WO    WO2004/066486    5/2004

\* cited by examiner

*Primary Examiner* — Rob Swiatek
*Assistant Examiner* — Richard R Green
(74) *Attorney, Agent, or Firm* — Pitts & Brittian, PC (57) ABSTRACT

An electronic animal containment system with direction-of-approach determination, or direction-sensitive animal containment system. The direction-sensitive animal containment system generally contains a transmitter unit connected to a wire loop bounding a containment area and a receiver unit carried by the animal. The direction-sensitive animal containment system of the present invention generates a containment field having polarity and retains the polarity information when the containment field is sensed using a sensing coil optimized along the azimuth. The receiver unit also generates a gravity vector to determine the orientation of the receiver unit. The gravity vector is combined with the containment field vector to produce a function that automatically yields a sensing coil output that is independent of the orientation of the receiver unit. The polarity of the sensing coil output allows determination of the direction from which the receiver unit is approaching the wire loop.

27 Claims, 8 Drawing Sheets

ELECTRONIC ANIMAL CONTAINMENT SYSTEM WITH DIRECTION OF APPROACH DETERMINATION

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The invention relates to an electronic animal containment system. More particularly, the invention relates to an electronic animal containment system capable of determining whether an animal approaching the boundary wire is inside or outside the containment boundary.

2. Description of the Related Art

Electronic animal containment systems are commonly used to keep an animal within a prescribed boundary. The typical electronic animal containment system includes a wire loop antenna that bounds the containment area, a transmitter connected to the wire loop that generates a signal carried by the wire loop, and a receiver responsive to the signal that issues warnings and/or corrections when the animal approaches the wire loop boundary.

Conventional electronic animal containment systems lack the ability to discriminate between an animal approaching the wire loop boundary from inside the bounded area and an animal approaching the wire loop boundary from outside the bounded area. Thus, if an animal manages to escape the bounded area, it will receive a warning and/or a correction when the animal attempts to reenter the bounded area.

A previous attempt to avoid correcting an animal as it returns to the containment area is described in U.S. Pat. No. 4,745,882, entitled "Electronic Confinement and Communications Arrangement for Animals," issued to Robert G. Yarnall, Sr., et al., on May 24, 1988 ("the '882 patent"). The '882 patent discloses the use of two boundary wires carrying distinct signals generated by two separate containment transmitters and a deactivation circuit that deactivates the containment transmitters when an animal escapes. By deactivating the containment transmitters, the animal can return to the containment area without receiving additional corrections. The advantages of the '882 patent are tempered by the required duplication of components and by the fact that reentry without correction requires deactivating the containment transmitters. When used with multiple animals, the escape of one animal deactivates the containment function with respect to both the escaped animal and the animals still within the bounded area.

U.S. Pat. No. 5,794,569, entitled "Apparatus and Method for Electronic Confinement of Animals," issued to John Titus, et al., on Aug. 18, 1998 ("the '569 patent") declares that there is "a need for an electronic animal control system which does not correct an animal trying to re-enter a confinement area." U.S. Pat. No. 5,794,569, col. 1, ll. 39-41. In order to determine whether the animal is leaving or entering the confinement area, the Titus apparatus includes a unipolar polarity pulse at the end of the coded signal. Id. at col. 10, ll. 63-67. The portable unit effectively drops the negative portion of the coded signal during the decoding process. See Id. at col. 11, ll. 1-25. Thus, the polarity of the coded signal is determined by the presence or absence of the polarity pulse. Id. When the presence or absence of the polarity pulse is combined with information from a tilt switch array, the portable unit is capable of predicting whether the animal is inside or outside the confinement area. Id. at 67. The portable unit notifies the transmitter using a radio signal when the boundary signal is detected. Id. at col. 5, ll. 30-34. The notification signal includes information about whether the animal is inside or outside the confinement area. Id. at col. 11, ll. 62-67. The transmitter determines the appropriate correction and generates a coded signal for instructing the portable unit how to correct the animal. Id. at col. 5, l. 34 to col. 6, l. 3. If the animal has escaped the confinement area and is attempting reentry, the portable unit must notify the transmitter has cleared the outer zone around the perimeter wire. Id. at col. 12, ll. 1-7.

BRIEF SUMMARY OF THE INVENTION

An electronic animal containment system with direction-of-approach determination, or direction-sensitive animal containment system is described herein. The direction-sensitive animal containment system generally contains a transmitter unit connected to a wire loop bounding a containment area and a receiver unit carried by an animal. The direction-sensitive animal containment system of the present invention generates a containment field having polarity and retains the polarity information when the containment field is sensed using a sensing coil optimized along the azimuth. The receiver unit also generates a gravity vector to determine the orientation of the receiver unit. The gravity vector is combined with the containment field vector to produce a function that automatically yields a sensing coil output that is independent of the orientation of the receiver unit. The polarity of the sensing coil output allows determination of the direction from which the receiver unit is approaching the wire loop.

The direction-sensitive animal containment system includes a transmitter that is connected to a wire loop. The wire loop defines the boundary of the containment area and is typically buried underground to protect the wire from damage. The wire loop serves as the transmitting antenna for the containment signal. The containment signal is used to define the warning and correction zones along the length of the wire loop. The direction-sensitive animal containment system also includes a receiver unit responsive to the containment signal. The receiver unit is worn or otherwise carried by an animal. The receiver unit senses the containment signal and issues a warning to the animal should the animal enter the warning zone. If the animal continues into the correction zone a correction stimulus is applied to the animal.

One embodiment of the transmitter includes a user interface allowing the user to set various parameters for the transmitter. The user interface communicates with a processing circuit which controls the operation of the transmitter. Using the parameters set by the user interface, the processing circuit generates an output that is fed into a containment signal generator. The containment signal generator produces an asymmetrical containment signal that contains sufficient information to determine the direction of approach. An output stage in communication with at least the containment signal generator provides any necessary amplification or other signal conditioning of the containment signal. A wire loop in communication with the output stage broadcasts the containment signal along its length.

The containment signal generator generates a containment signal that produces different characteristics on each side of the wire loop i.e., an asymmetric waveform. The asymmetric waveform is backwards compatible with existing electronic animal containment system receivers allowing containment functions without direction-of-approach determination. More specifically, the waveform of the containment signal is a polarized waveform. The right-hand rule states that the signal polarity in a vertically oriented sensing coil will invert when it crosses over the wire loop because the direction of the magnetic field oriented in the vertical direction on one side of a current-carrying wire is opposite to the direction of the magnetic field oriented in the vertical direction on the opposite side of that wire.

In one embodiment of the direction-sensitive animal containment system, the receiver unit includes one or more inductive sensing coils that are sensitive to the containment signal generated by the transmitter. The output of the sensing coils feeds a signal conditioning circuit. The output of the sensing coils make the received signal available to the processing circuit. The processing circuit provides the control logic for the receiver unit determining whether a warning or correction is necessary and the direction-of-approach and then causing the generation of the warning or correction stimulus. The direction-of-approach is determined by monitoring the duty cycle of the received signal. An optional orientation detector in the receiver unit generally determines the direction of the Earth's gravitational field. Signals from the orientation detector allow the processing circuit to determine the orientation of the receiver unit and correctly interpret the polarity of the received signal.

The direction-sensitive containment system works on the principle that the voltage in a sensing coil is proportional to the rate of change of current in a nearby wire. When the transmitted waveform has a faster rise time than fall time, the result is an uneven voltage duty cycle in the sensing coil as represented by waveforms. The direction of the current flow in the wire does not matter as long as its rate of change stays relatively constant during each half-cycle.

Because the in/out determination allows warnings and corrections to be generated only when the animal approaches the wire loop from inside the containment area, the warning/correction scheme can be customized to provide for more effective training. In one embodiment, the warning/correction scheme implements a triggered duration. If the animal moves from the correction zone inside the containment area to the escape zone outside of the wire loop, the receiver unit continues to issue a correction for a selected time period. The length of the correction time period is selected to be sufficient to provide a correction for a significantly greater distance than the range of a prior art containment signal. The maximum length of the correction time period is limited only by humane considerations and battery life.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An electronic animal containment system with direction-of-approach determination, or direction-sensitive animal containment system, is described herein and illustrated in the accompanying figures. The direction-sensitive animal containment system generally contains a transmitter unit connected to a wire loop bounding a containment area and a receiver unit carried by the animal. The direction-sensitive animal containment system of the present invention generates a containment field having polarity and retains the polarity information when the containment field is sensed using a sensing coil optimized along the azimuth. The receiver unit also generates a gravity vector to determine the orientation of the receiver unit. The gravity vector is combined with the containment field vector to produce a function that automatically yields a sensing coil output that is independent of the orientation of the receiver unit. The polarity of the sensing coil output allows determination of the direction from which the receiver unit is approaching the wire loop.

Figure 1:
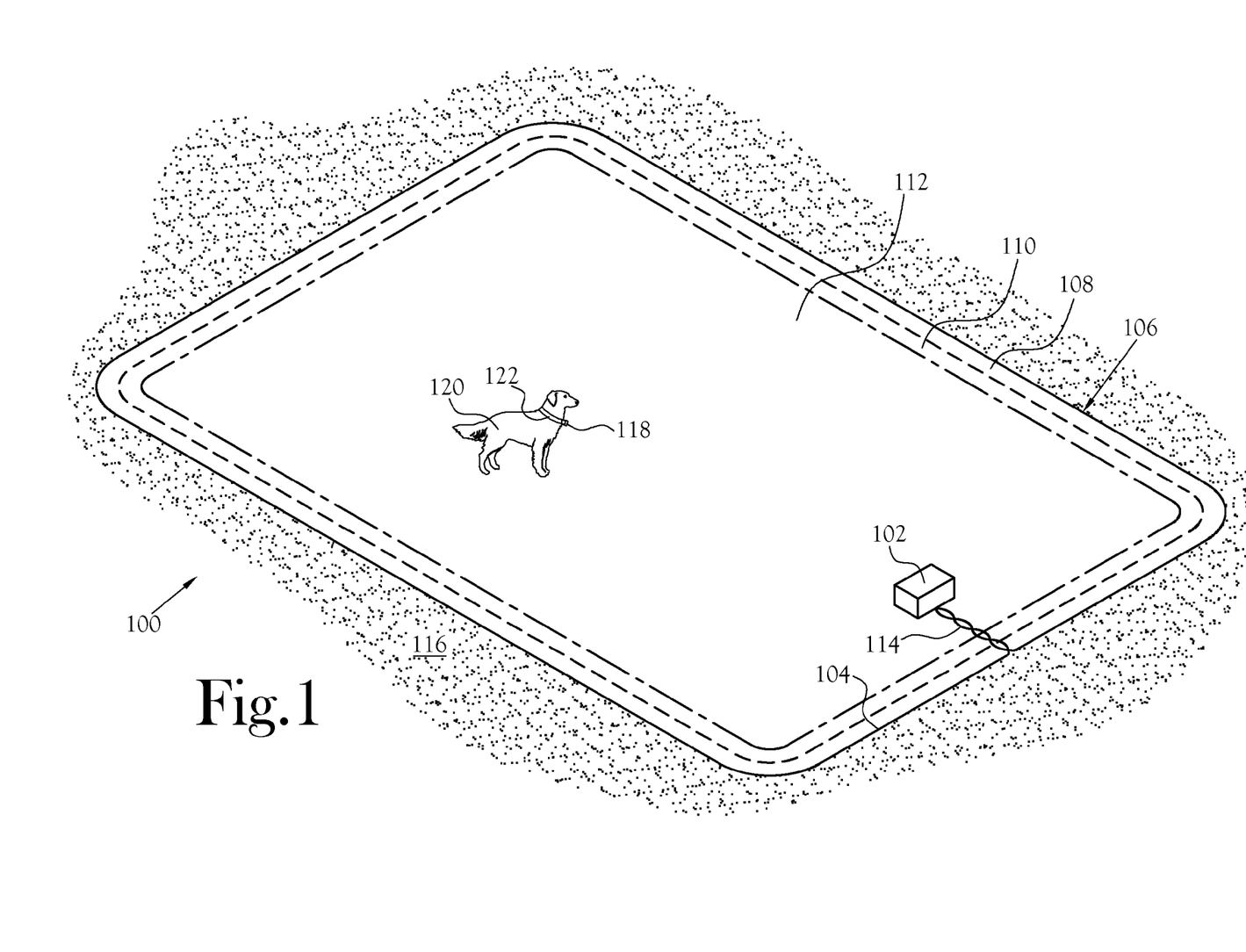
FIG. 1 is an illustration of the direction-sensitive animal containment system of the present invention.

FIG. 1 is an illustration of the direction-sensitive containment system 100 according to the present invention. The direction-sensitive animal containment system 100 includes a transmitter 102 that is connected to a wire loop 104, which is represented in the drawing by an object line. The wire loop 104 defines the boundary of the containment area 106 and is typically buried underground to protect the wire from damage. The wire loop 104 serves as the transmitting antenna for the containment signal. The dashed line represents the edge of the correction zone 108 within the containment area 106 and the dashed-and-dotted line represents the edge of the warning zone 110 within the containment area 106. The area bounded by the warning zone 110 is the safe zone 112. The portion 114 of the wire loop from the transmitter 102 to the desired boundary location is often located within the safe zone 112 and typically has the ends of the wire loop twisted together to effect the cancellation of the containment signal for that portion 112 of the wire loop. The area outside of the wire loop represented by the stippling is the escape zone 116. The direction-sensitive animal containment system 100 operates at very low frequencies, such as 7 KHz or 10 KHz, and the near field signals are used for proximity detection.

The direction-sensitive animal containment system 100 also includes a receiver unit 118 responsive to the containment signal. The receiver unit 118 is worn or otherwise carried by an animal 120. In the illustrated embodiment, the receiver unit 118 is worn on a collar 122. One skilled in the art will appreciate that the receiver unit 118 may be carried in other ways such as a strap, a harness, or animal clothing without departing from the scope and spirit of the present invention. The receiver unit 118 senses the containment signal and issues a warning to the animal 120 should the animal 120 enter the warning zone 110. Warnings are typically audible sounds that alert the animal that a correction will follow if the animal continues toward the boundary 104. Should the animal 120 continue into the correction zone 108, a correction stimulus is applied to the animal 120. A commonly used correction technique is the use of an electric shock designed to discourage the continued approach of the animal toward the boundary 104. One skilled in the art will recognize that any warning or correction technique can be used without departing from the scope and spirit of the present invention.

Figure 2:
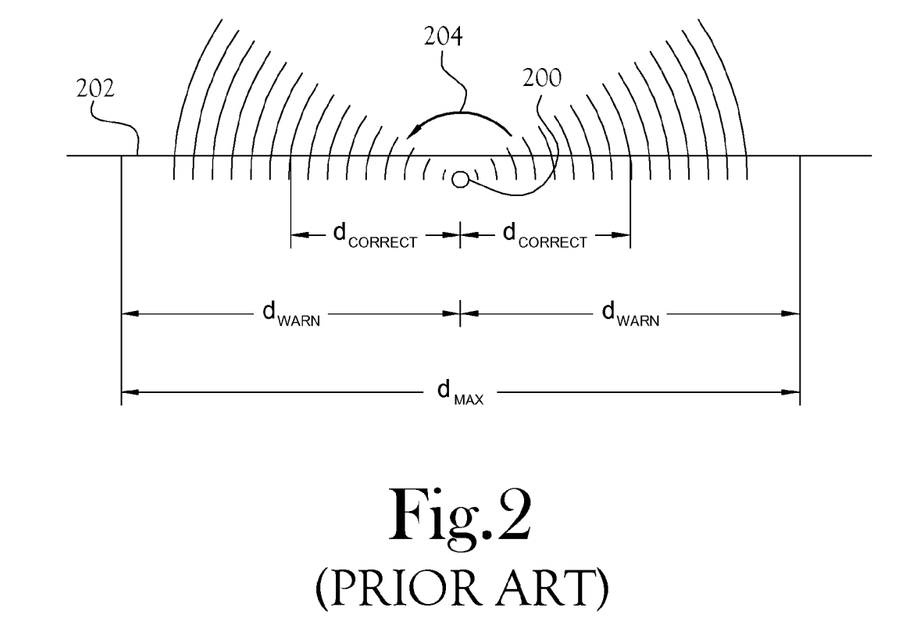
FIG. 2 illustrates a buried wire and a prior art containment signal radiating therefrom with distance dimensions.

FIG. 2 illustrates the electromagnetic field radiating from a wire 200 buried under the ground 202 where $d_{MAX}$ is the maximum width of the boundary field, $d_{WARN}$ is the distance from the boundary wire at which the signal strength reaches the level for a warning signal, and $d_{CORRECT}$ is the distance from the boundary wire at which the signal strength reaches the level for a correction signal. Assuming current flowing out of the page, the electromagnetic field radiates in the direction shown by arrow 204. The approximate magnetic flux density for a current-carrying wire is given by the equation:

$$B\phi = \frac{\mu_0 I}{2\pi d}, \quad (1)$$

where $B\phi$ is the magnetic flux density, I is the current, d is the distance from the wire, and $\mu_0$ is the permeability constant ($4\pi \times 10^{-7}$ H/m). The approximate magnetic flux density generated at a distance of approximate one foot from a wire carrying 20 milliamps of current, which is on the order of a typical containment signal current, is:

$$B\phi = \frac{\left(4\pi \times 10^{-7} \frac{H}{m}\right) 20 \text{ mA}}{2\pi(1 \text{ ft})} = 121.212 \times 10^{-6} G. \quad (2)$$

Thus, the magnetic flux density proximate to the wire as a result of the flowing current is about 4000 times less than the magnetic field of the Earth, which is approximately 0.5 G in the United States.

Normally, the buried wire loop 104 is electrically excited with a non-polarized sinusoidal signal that provides no information concerning the location of the sensing coil relative to the wire loop 104. Thus, the warning zone 110 and the correction zone 108 are mirrored on both sides of the containment boundary 106. As will be appreciated from FIGS. 2 and 3 and Equations 1 and 2, the width of the zones are limited by the output power of the electronic animal containment system. For a conventional electronic animal containment system, the value of $d_{max}$ is approximately 30 feet when the transmitter is operated at maximum power. This provides approximately 15 feet for both the warning zone 110 and the containment zone 108 within the containment boundary 106. If the width of the warning zone 110 is approximately equal to the width of the correction zone 108, the total width of the correction zone, both inside and outside of the containment boundary 106, is approximately 15 feet. A domestic dog moving at a speed of approximately 20 miles per hour covers approximately 29 feet per second. At the maximum boundary width (maximum transmitter power), a dog running at full speed can cross the entire boundary in approximately one second and will experience a correction for only approximately one-half of one second. Thus, in practice, many users of an electronic animal containment system operate the system at maximum power to provide the maximum zone width. However, it should be appreciated that a dog in an excited state can breach the boundary of the conventional electronic animal containment system with little discomfort.

Figure 3:
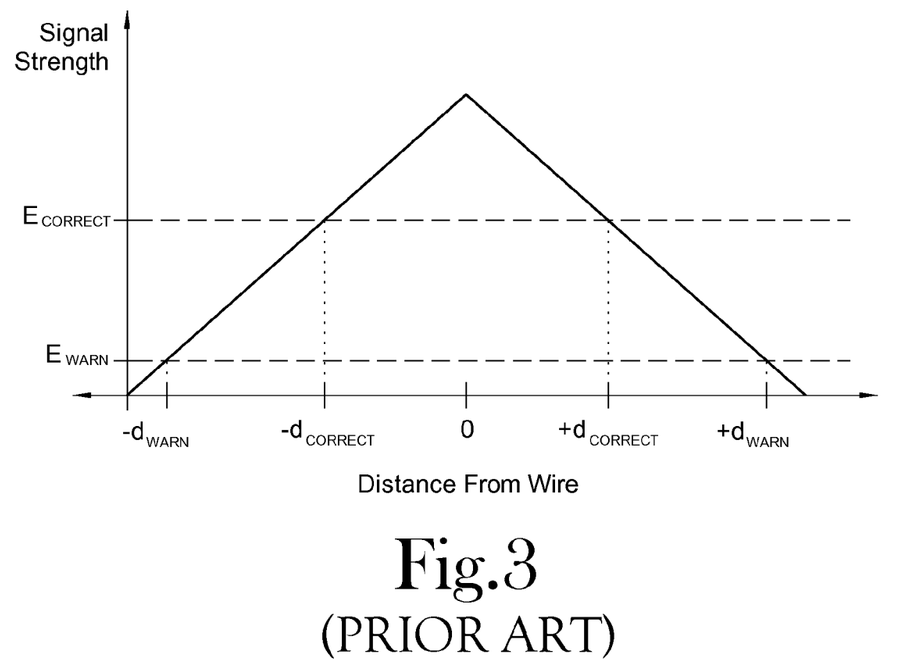
FIG. 3 charts signal strength against distance from the wire to illustrate the inability to distinguish direction using a prior art electronic animal containment system.

FIG. 3 charts the strength of the containment signal against the distance from the wire typical of the threshold detection scheme used by prior art electronic animal containment systems. By measuring the strength of the containment signal seen by the receiver unit, the relative proximity to the wire loop is determined. The closer the receiver unit is brought to the boundary wire, the stronger the received signal. The receiver unit compares the received signal strength to a threshold level. At a first energy level, a warning threshold, a warning is generated and a correction occurs when a second energy level, a correction threshold, is reached. In such a system, the minimum and maximum range of the containment signal is limited by the transmission power of the transmitter.

A prior-art electronic animal containment system using a single wire has no ability to determine whether the animal is approaching the boundary 104 from the escape zone 116 or from the containment area 106. Thus, if the animal 120 escapes and tries to return to the containment area 106, the animal 120 will receive the same warnings and corrections it would receive if it were attempting to escape the containment area 106. Thus, once outside the wire loop, the animal has effectively entered another safe zone. Transmitting at the maximum power provides a larger buffer and offers a greater chance of an effective deterrent but also diminishes the safe zone available to the animal.

Figure 4:
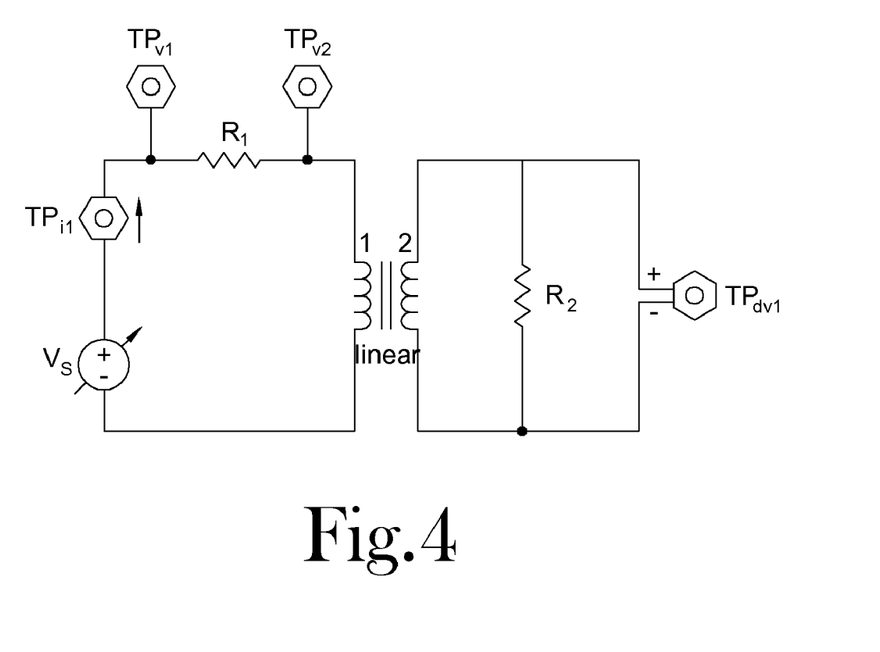
FIG. 4 is a model or equivalent circuit diagram for the direction-sensitive animal containment system.

FIG. 4 is circuit diagram modeling a lightly-coupled transformer 400 having a primary coil 402 representing the buried cable and a secondary coil 404 representing the sensing coil in the receiver unit. The model circuit 400 includes test points $TP_{v1}$ and $TP_{dv1}$ that serve as points of reference for the signals discussed in relation to FIGS. 5 and 8.

Figure 5:
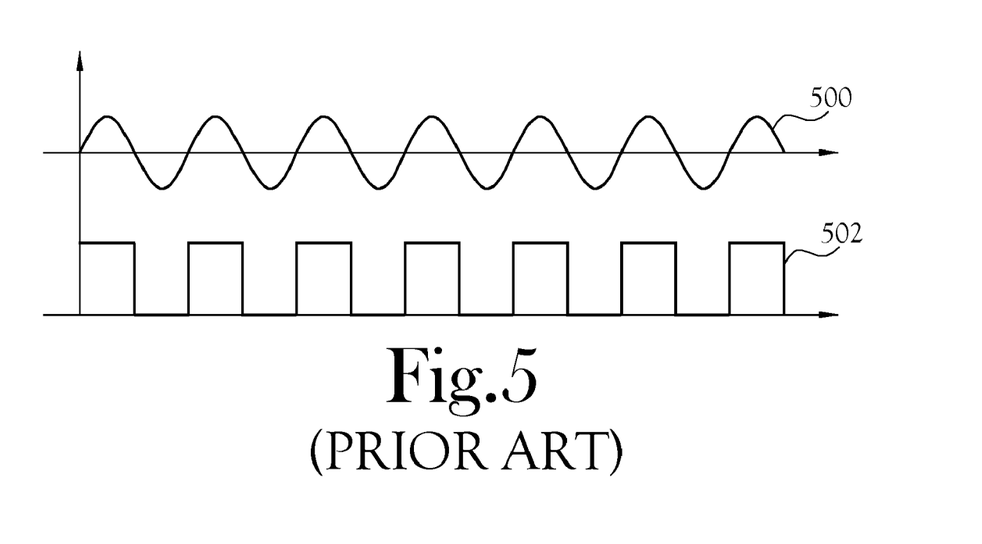
FIG. 5 is an illustration of the waveforms generated by the transmitter and receiver of a prior art electronic animal containment system.

FIG. 5 illustrates the waveforms of a conventional electronic animal containment system. In a conventional electronic animal containment system, the boundary wire is electrically excited with a sinusoidal signal 500 such as that illustrated in FIG. 5. A sinusoidal signal is un-polarized, meaning that observing the induced/received signal provides no information relative to the orientation of the sensing (pickup) coil. In an exemplary conventional electronic animal containment system, the processor produces a square wave output that is filtered to produce the sinusoidal signal 500. The sinusoidal signal 500 feeds an op amp stage with a current driver/amplifier in the feedback path to produce the containment signal (not shown).

The waveform of the received signal 502 in a prior art electronic animal containment system taken at test point $TP_{dv1}$ is also shown in FIG. 5. The received signal 502 is a symmetrical square wave corresponding to the positive and negative half-cycles of the sinusoidal signal 500. The signal is identical regardless of the direction that the receiver unit approaches the wire, with the obvious exception that the direction of the magnetic field on is reversed. Because the source signal 500 results in a symmetrical received signal 502, the received signal 502 generates a signal with a fifty-percent (50%) duty cycle and contains insufficient information to determine whether or not the sensing coil is reversed, i.e. the polarization of the received signal is undetectable.

Figure 6:
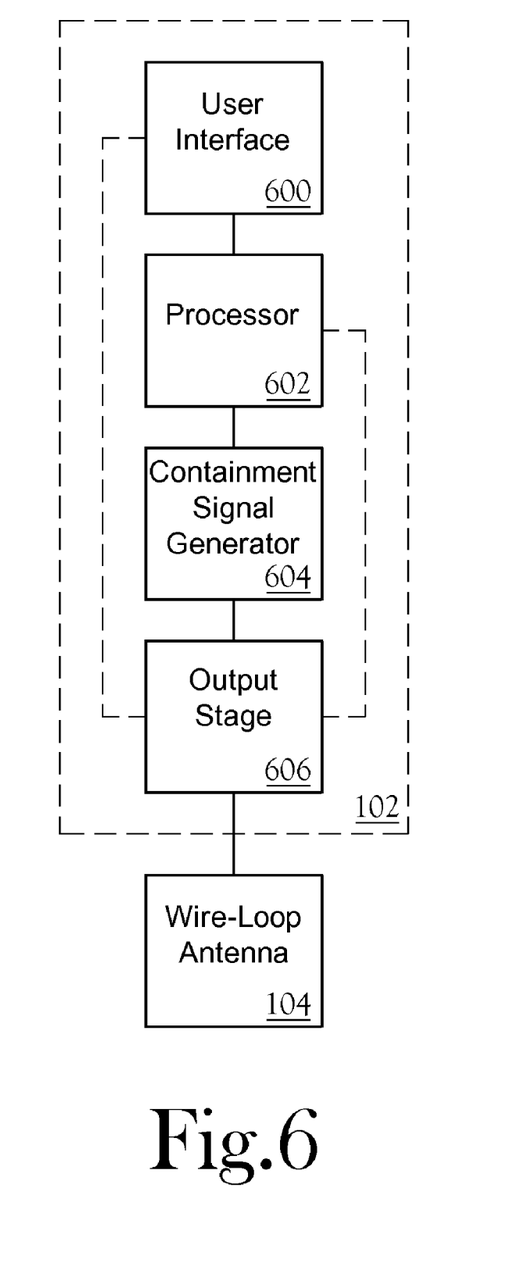
FIG. 6 is a block diagram of the containment transmitter of one embodiment of the direction-sensitive animal containment system.

FIG. 6 is a block diagram of one embodiment of the transmitter 102 of the present invention. The transmitter 102 includes a user interface 600 allowing the user to set various parameters for the transmitter 102. The user interface 600 communicates with the processing circuit 602, which controls the operation of the transmitter. Using the parameters set by the user interface, the processing circuit 602 generates an output that is fed into the containment signal generator 604. The containment signal generator 604 produces an asymmetrical containment signal that contains sufficient information to determine the direction of approach. An output stage 606 in communication with at least the containment signal generator 604 provides any necessary amplification or other signal conditioning of the containment signal. A wire loop 104 in communication with the output stage 606 broadcasts the containment signal along its length.

The user interface 600 includes input and output devices allowing a user to set the parameters of the transmitter 102. In one embodiment, the user interface 600 controls the output stage 606 through the processing circuit 602. Alternatively, the user interface 600 controls the output stage 606 in combination with processing circuit 602 or independent of the processing circuit 602. Exemplary input devices include various analog or digital mechanisms for data entry such as switches, buttons, knobs, and keypads. Exemplary output devices include visual and audible indicators such as light-emitting diodes (LEDs), liquid crystal displays (LCDs), and speakers. The user interface 600 also includes any necessary signal conditioning to make the input usable by the processing circuit. Examples of the parameters set by the user interface include the range of the broadcast signal and the mode of operation. In one embodiment, the mode of operation allows the user to select whether the containment signal carries information for a warning only or for both warnings and corrections.

The processing circuit 602 is any logic device or circuit, either analog or digital that provides the necessary decision-making and sequencing capability to operate the transmitter. One suitable device for the processing circuit is the PIC16C505 microcontroller from Microchip Technology, Inc. Other devices and circuits can be used for the processing circuit 602 without departing from the scope and spirit of the present invention. In one embodiment, the processing circuit 602 drives the containment signal generator with a square wave having an uneven duty cycle, for example approximately sixty percent (60%).

The containment signal generator 604 generates a containment signal that produces different characteristics on each side of the wire loop 104. The containment signal generator 604 converts the uneven duty cycle square wave into an asymmetric triangle wave. In one embodiment, the containment signal generator 604 is an operational amplifier integrator stage. In testing, the present inventors noted that the quality of the triangle signal generator output stage varied with component selection. For example, using a LM641 operational amplifier with a gain bandwidth (GBW) of approximately one megahertz (1 MHz) severely distorted the positive portion of the triangle wave. An operational amplifier having a larger GBW of approximately 15 megahertz and a slew rate of 50 volts per microsecond produced a better triangular waveform. One suitable device is the LM318 operational amplifier. Furthermore, the triangle waveform is backwards compatible with existing electronic animal containment system receivers allowing containment functions without direction-of-approach determination.

In an alternate embodiment, the containment signal generator generates a triangle wave independent of the processing circuit. The containment signal generator includes a discrete triangle wave generator allowing the adjustment of the rising and falling slopes. The discrete triangle wave generator directly drives the output current drivers and provides two amplitude levels for the triangle waveform. The discrete triangle wave generator includes three operational amplifier stages and a controller. The first two operational amplifier stages provide frequency and slope adjustments to transform the base signal into a triangle waveform. The third operational amplifier stage adjusts the DC offset and gain. The controller varies the amplitude of the triangle waveform to allow distinction between warnings and corrections and controls the on/off timing of the triangle waveform.

Figure 13:
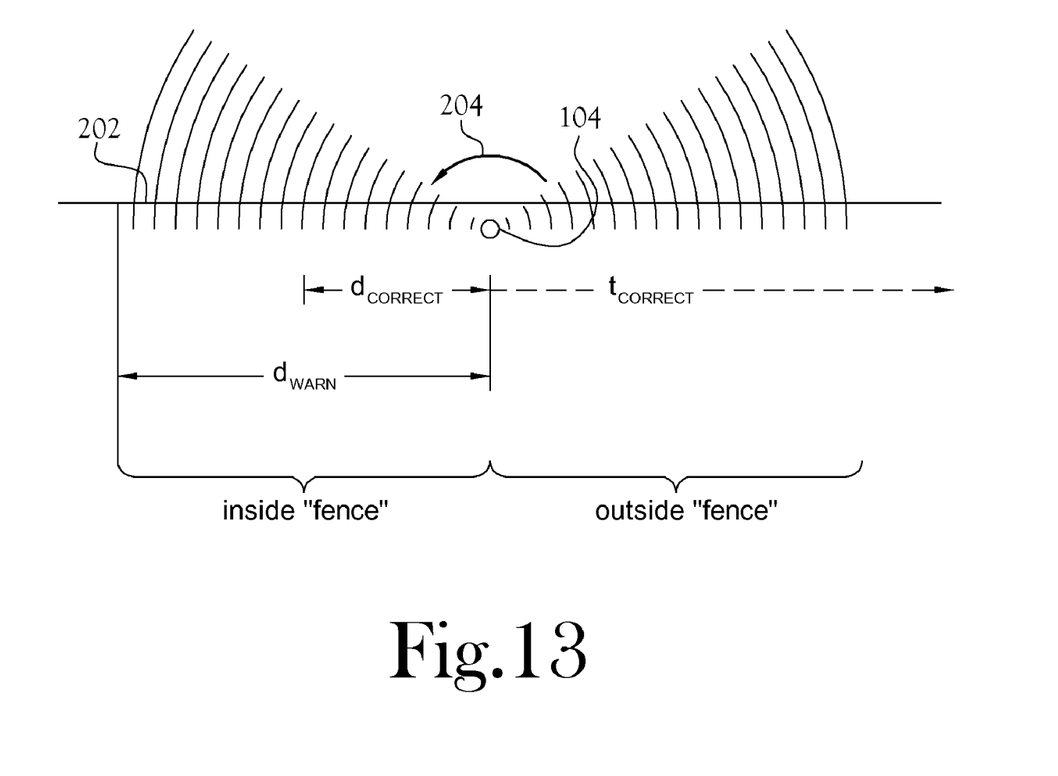
FIG. 13 illustrates a buried wire and the containment signal of the direction-sensitive containment system showing where stimuli are generated.

More specifically, the waveform of the containment signal is a polarized waveform. The right-hand rule states that the signal polarity in a vertically oriented sensing coil will invert when it crosses over the wire loop because the direction of the magnetic field oriented in the vertical direction on one side of a current-carrying wire is opposite to the direction of the magnetic field oriented in the vertical direction on the opposite side of that wire. Referring to FIG. 13 the direction of the magnetic field on the right side of the wire is upward relative to the ground and down relative to the ground on the left side of the wire.

Figure 7:
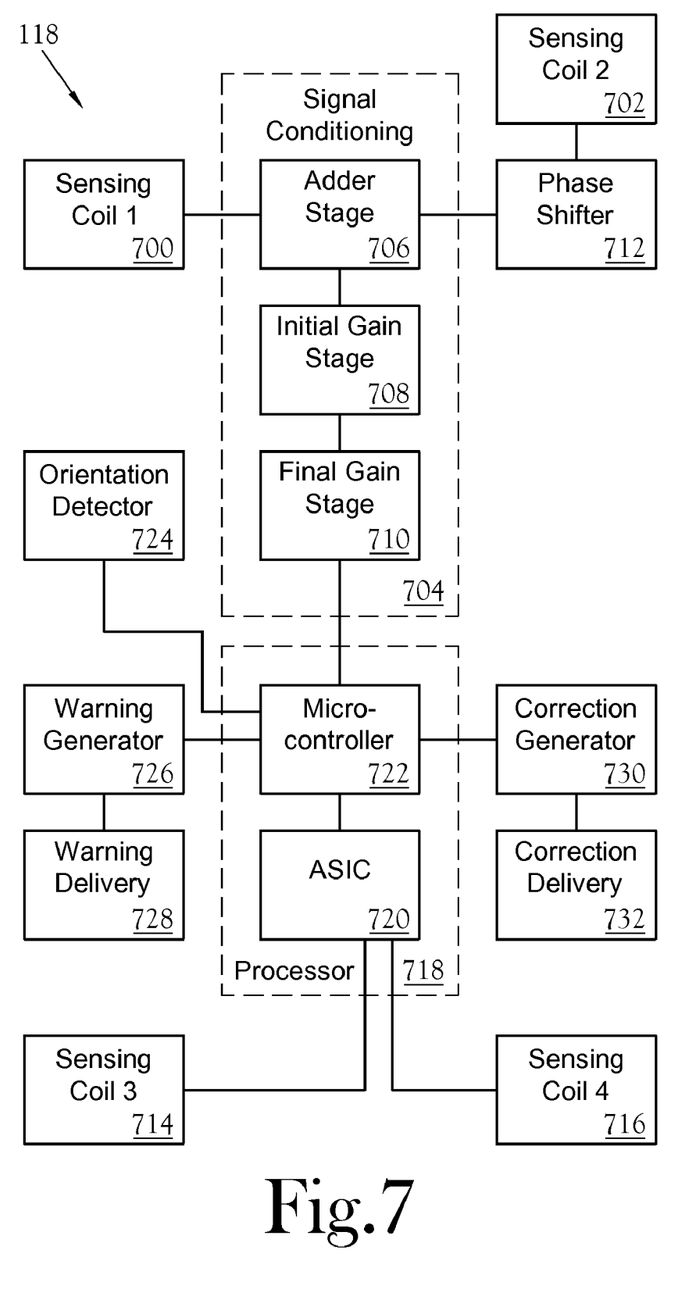
FIG. 7 is a block diagram of the containment transmitter of one embodiment of the direction-sensitive animal containment system.

FIG. 7 is a block diagram of the receiver unit 118 in one embodiment of direction-sensitive animal containment system 100. The receiver unit 118 includes one or more inductive sensing coils 700, 702 that are sensitive to the containment signal generated by the transmitter 102. In one embodiment, two sensing coils 700, 702 are used with one being tuned to the 10.7 KHz fundamental frequency and the other being tuned to the 32 KHz third harmonic frequency. The output of the sensing coils 700, 702 feeds a signal conditioning circuit 704. The signal conditioning circuit 704 includes an operational amplifier adder stage 706, a low-noise high-gain op-amp front-end 708, and a final gain stage 710. The operational amplifier adder 706 is used to combine the outputs of the two sensing coils 700, 702 for processing. An optional phase shift circuit 712 is provided to shift the phase of the signal received by one of the sensing coils 702 so that the received signal aligns with the signal received by the other sensing coil 700 before combining the sensing coil outputs in the operational amplifier adder 706. In the illustrated embodiment, the receiver unit 118 includes two additional sensing coils 714, 716. The output of the sensing coils 700, 702, 714, 716 make the received signal available to the processing circuit 718, which includes a first processing device 720 and a second processing device 722.

The additional sensing coils 714, 716 are included when, as in the illustrated embodiment, the processing circuit 718, which provides the control logic for the receiver unit 118, uses the first processing device 720 that is not direction-of-approach aware, typically an existing application specific integrated circuit (ASIC). This arrangement allows existing product designs to add direction-of-approach capability without requiring design of a new ASIC. In the illustrated embodiment, the ASIC 720 decodes the signal received at the additional sensing coils 714, 716 and determines whether a warning stimulus or a correction stimulus should be applied to the animal. The result of the decision is passed on to a second processing device 722 which controls the generation of the requested stimulus and determines the direction-of-approach.

In the illustrated embodiment, the ASIC 720 decodes and analyzes the received signal using a combination of timing and threshold determination to reject spurious signals. If the received signal has a sufficient magnitude for sufficient time, the ASIC 720 produces an output indicating that the animal is proximate to the boundary. By encoding the containment signal with distinct signal levels and timing for the warning component and the containment component, the ASIC 720 is further able to determine whether to indicate the warning zone has been entered or the correction zone has been entered. A specific example of this coding scheme provides a warning component having a first magnitude that occurs for a specific duration. The correction component has a second magnitude that is less than the first magnitude that also occurs for a specific duration. The correction component occurs immediately following the warning component. As the animal approaches the wire loop, the signal strength increases. Within the warning zone, only the warning component will have sufficient magnitude to be considered active and, thus, the ASIC 720 will only recognize activity on the containment signal for the duration of the warning signal. As the animal continues to approach the wire loop, the magnitude of received signal increases. As the animal enters the containment zone, both the warning component and the correction component have sufficient magnitude to be considered active. Although still having uneven relative magnitudes, both the warning component and the correction component are recognized as active by the ASIC 720 and the activity duration is the combined duration of the warning component and the correction component. In this manner, the ASIC 720 determines whether the receiver unit is within the warning zone or the correction zone. One skilled in the art will recognize other encoding/decoding schemes and ways to determine whether the receiver unit is within the warning zone or the correction zone without departing from the scope and spirit of the present invention. Other boundary detection schemes and the corresponding circuitry will be appreciated by those of ordinary skill in the art.

As previously mentioned, the second processing device 722 is responsible for generation of the requested stimulus and for determining the direction-of-approach. One suitable device used to implement the second processing device 722 is the PIC16F628A microcontroller from Microchip Technology, Inc. The stimulus generation occurs as a result of the output from the ASIC 720, which is passed to the microcontroller 722. However, because the ASIC 720 processes the received signal and passes only the result to the microcontroller 722, the information in the received signal is not available to the microcontroller 722. Accordingly, the sensing coils 700, 702 and the signal conditioning circuit 704 are used to provide the microcontroller 722 with the information in the received signal necessary to make the direction-of-approach determination.

The microcontroller 722 monitors the duty cycle of the received signal to determine whether the receiver unit 118 is approaching the wire loop 104 from inside or from outside the containment area. Looking ahead to FIG. 8, one can see that the duty cycle of the received signal varies depending upon the direction because of the asymmetrical waveform. The microcontroller 722 is in communication with the first processing device 720. Specifically, the microcontroller 722 wakes from a sleep (low power) upon receipt of the warning output signal from the ASIC 720. The warning output signal is used because the generation of the warning output signal occurs before the generation of the correction output signal. Waking the microcontroller 722 only when the receiver unit 118 is proximate to the wire loop reduces the power consumed by the receiver unit 118.

In the illustrated embodiment, the receiver unit 118 includes an optional orientation detector 724, such as an integrated circuit accelerometer, in communication with the microcontroller 722. The orientation detector 724 generally determines the direction of the Earth's gravitational field. Signals from the orientation detector 724 allow the microcontroller 722 to determine the orientation of the receiver unit and correctly interpret the polarity of the received signal.

Because the frequency band needed to receive the polarized waveform is greater than that of just the fundamental waveform used in existing electronic animal containment system receivers, the sensing coils of the receiver unit are less sensitive. The receiver unit 118 attenuates the received signal provided to processing device 718 to match the sensitivity of the required to processes the received signal for the in/out determination. In one embodiment, the transmitter 102 is designed to increase the drive current of the containment signal to compensate for the signal attenuation.

Finally, the receiver unit 118 includes a warning stimulus generator 726 responsive to the processing device 718 that generates a warning signal delivered to the animal through the warning stimulus delivery system 728. Similarly, a correction stimulus generator 730 responsive to the processing device 718 generates a correction signal that is delivered to the animal through the correction stimulus delivery system 732. Unlike the prior art systems, the direction-sensitive animal containment system 100 only delivers warning and correction when the animal approaches the wire loop from within the containment area.

While one embodiment of the receiver unit has been shown and described, one skilled in the art will recognize various modifications that may be desirable in a production unit without departing from the scope and spirit of the present invention. For example, one skilled in the art will recognize that the number, composition, and order of the stages in the signal conditioning circuit 704 can be altered as necessary. One skilled in the art will also recognize that the number of sensing coils can be reduced by modifications to the processing circuit 718. For example, a redesigned ASIC or a different general purpose processor that can perform the functions of the ASIC and/or the microcontroller could replace the ASIC and/or the microcontroller and extract all necessary information from the signal received by only one set of sensing coils. It will be appreciated by one skilled in the art that unwanted high frequency noise can be eliminated by making one of the operational amplifier stages into an active filter. Further, the type and number of processing devices making up the processing circuit will depend upon the available components, the specific implementation, and the desired feature set of the receiver unit. Thus, it should be understood that the processing circuit may include a single processing device that performs all of the necessary functions of the present invention. Variations in the type or number of processing devices are considered to remain with the scope and spirit of the present invention.

In an alternate embodiment employing a single sensing coil, the sensing coil operates over a wider bandwidth than just the fundamental frequency in order to receive the polarized transmitter signal. The single sensing coil is tuned to 19 KHz with 3 dB frequencies at approximately 11.5 KHz and 31.3 KHz in order to pass the fundamental 10.7 KHz and 3rd harmonic frequencies and also help filter out of band interference.

One skilled in the art will recognize that an engineering tradeoff exists between the quality factor, Q, of the sensing coil(s) and the amount of transmit signal polarization. It should also be recognized that the numeric values offered for the tuning of the sensing coil(s) are exemplary and are not intended to limit the disclosure in any way. Further, one skilled in the art will recognize that the tuning of the sensing coil(s) can vary without departing from the scope and spirit of the present invention. Finally, the receiver section of the receiver unit has been described in both one and two-dimensional implementations; however, one of ordinary skill in the art should be able to extend the receiver implementations discussed herein.

Figure 8:
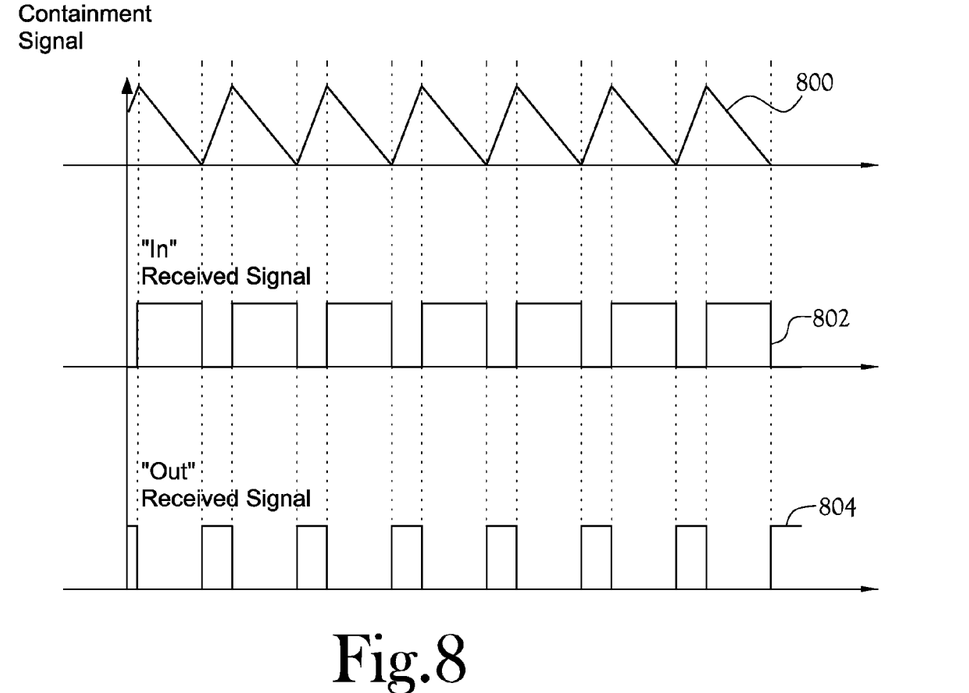
FIG. 8 is an illustration of the waveforms generated by the transmitter and receiver of the direction-sensitive animal containment system.

FIG. 8 illustrates an asymmetrical excitation waveform 800 produced by the direction-sensitive containment system 100 to drive the containment signal and the resulting waveforms 802, 804 occurring in the receiver unit. The direction-sensitive animal containment system of the present invention replaces the commonly-used sinusoidal containment signal with an asymmetrical triangular waveform 800. The asymmetrical triangular waveform 800 represents an ideal signal from the waveform generator. In practice, an asymmetrical triangular waveform carried by wire loop without significant resistance becomes more rounded but the asymmetrical triangular waveform retains sufficient asymmetry for detection.

The direction-sensitive containment system 100 works on the principle that the voltage in a sensing coil is proportional to the rate of change of current in a nearby wire 104. When the transmitted waveform has a faster rise time than fall time, the result is an uneven voltage duty cycle in the sensing coil as represented by waveforms 802, 804. The direction of the current flow in the wire doesn't matter as long as its rate of change stays relatively constant during each half-cycle.

Because of the asymmetrical excitation waveform 800, the duty cycle of the received signals 802, 804 indicates the polarity of the received signals. The middle waveform 802 represents the output of the sensing coil when the receiver unit is inside the wire loop. The lower waveform 804 represents the output of the sensing coil.

Figure 9:
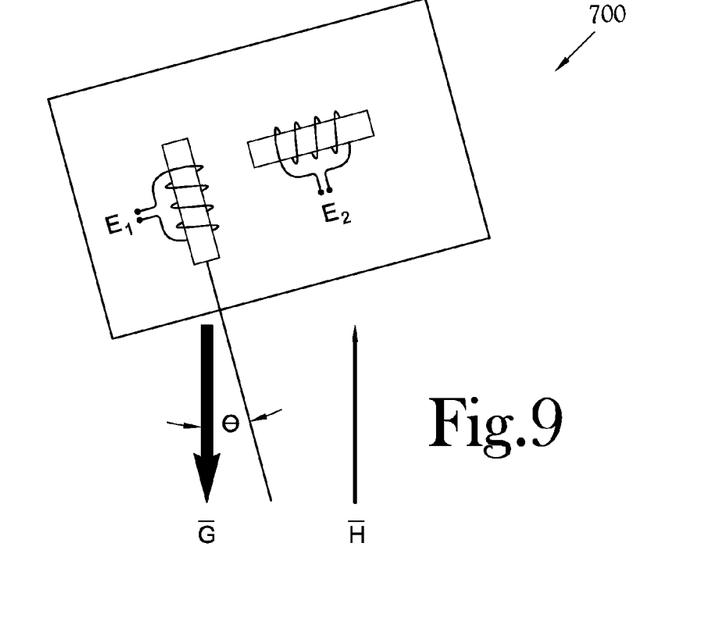
FIG. 9 illustrates an example of the orientation of the sensing coils in the receiver unit of the direction-sensitive animal containment system relative to the gravity vector and the containment field vector.

FIG. 9 illustrates a representative receiver unit 700 having two sensing coils, $E_1$, $E_2$, arranged orthogonal to each other. The containment signal sensed by the coils is given by $$E_1 = E_m \cdot \cos(\theta) \tag{3}$$

and $$E_2 = E_m \cdot \sin(\theta), \tag{4}$$

where $E_m$ is the maximum containment signal received when either coil is perfectly aligned with the correction field vector. Assuming that the vertical coil $E_1$ of the receiver unit 700 is oriented at an angle $\theta$ with respect to the gravity vector G and that the correction field vector H is co-linear with the gravity vector, the internal vector dot product forms the components $$\overline{G} \cos(\theta) \cdot \overline{E}_m \cos(\theta) + \overline{G} \sin(\theta) \cdot \overline{E}_m \sin(\theta), \tag{5}$$

which reduces to the identity of $$G \cdot \overline{E}_m. \tag{6}$$

Fortunately, this assumption proves to be a good approximation over most of the region as an animal approaches the wire loop.

The amount of magnetic field density sensed by a coil is determined by the vector dot product of the coil output vector and the magnetic field vector. When the coil core is oriented parallel to the magnetic field vector, the full strength of the magnetic field is detected. When the coil core and the magnetic field vector are offset, the actual magnetic field strength sensed is decreased by the cosine of the angle between them. Therefore, very little of the magnetic field is detected when the coil core is oriented perpendicular to the magnetic field vector. The received signal has the largest amplitude when a sensing coil is tangent to an imaginary circle around the wire such that the electromagnetic field travels parallel to the coil core. Clearly, it is desirable to have at least one sensing coil in a substantially vertical orientation as the animal approaches the wire loop.

Before continuing, it is useful to set forth some basic assumptions that simplify the design of the direction-sensitive animal containment system. First, it is assumed that the animal carries a receiver unit between the animal and ground, which implies that the animal approaches the containment area in an upright manner. Second, it is assumed that the range of vertical rotation (rotation about the horizontal axis) of the receiver unit is approximately ninety degrees ($\leq 90°$) or less. If the receiver unit remains within the assumed vertical rotation range, the orientation of the receiver unit is always known. Third, it is assumed that the wire loop does not double back on itself and, thereby, change or obscure the polarity of the containment signal. In general, these assumptions standardize the containment signal and limit the possible orientations of the receiver unit to simplify the polarity determination on the received signal.

A receiver unit based on the aforementioned assumptions operates properly as long as the receiver unit remains in the orientation specified by the assumptions. Specifically, the assumptions limit the animal to approaching the wire loop moving in an upright manner on all four legs with normal body positioning. These assumptions are likely to result in a direction-sensitive containment system that operates properly in a majority of cases.

The risk with the second assumption is that the receiver unit becomes oriented in a position that causes a receiver unit having a single sensing coil to detect the magnetic field vector at an angle greater than ninety degrees (90°). At angles greater than ninety degrees (>90°), the polarity seen by the sensing coil is no longer accurate. As a result, the sensing coil produces a received square wave having the wrong polarity. With the addition of the optional second sensing coil, as discussed above, the range for accurate polarity detection becomes approximately one-hundred eighty degrees (~180°).

The optional orientation detector 724 shown in the block diagram of FIG. 7 extends the functionality of the direction-sensitive containment system 100 so that some or all of the assumptions previously discussed need not be valid. The orientation detector 724 allows accurate determination of polarity over a wider range. For a single sensing coil, the ability to determine whether the receiver unit is upside-down allows polarity detection over approximately one-hundred eighty degrees. When two mutually-orthogonal sensing coils are used, the range for accurate polarity determination approaches a full three-hundred sixty degrees (360°).

Figure 10:
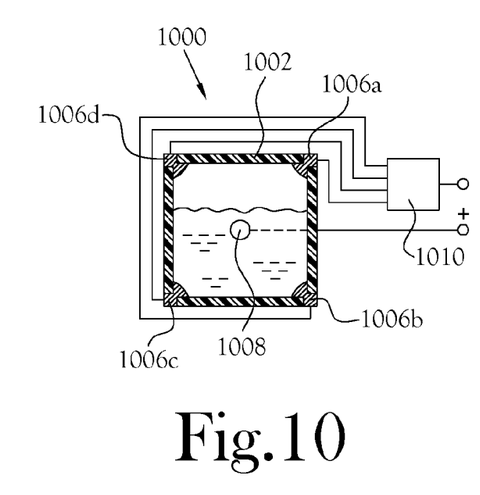
FIG. 10 is an illustration of a planar gravity sensor suitable for use with the present invention.
Figure 11:
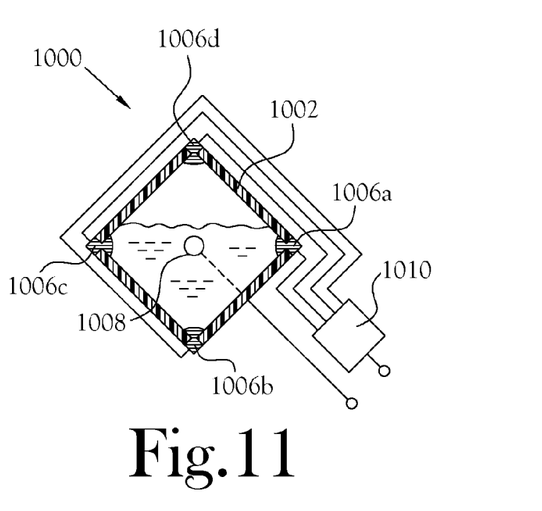
FIG. 11 is an illustration of a planar gravity sensor in a rotated orientation relative to FIG. 8 showing the available forty-five degree (45°) resolution.

One way of determining the orientation of the collar is by creating an electrical representation of a gravity vector. FIGS. 10 and 11 illustrate one embodiment of a planar gravity sensor 1000 for determining collar orientation through generation of a gravity vector. In the illustrated embodiment, the planar gravity sensor 1000 is a hollow square 1002 fabricated from an electrically non-conductive material and partially filled with an electrically conductive liquid 1004. The liquid 1004 occupies at least half of the volume within the planar gravity sensor 1000. Each corner of the square 1002 creates one of four electrically-isolated contact points 1006*a-d*. The contact points 1006*a-d* are formed by plating or filling the corners with an electrically conductive material or other similar techniques. An additional contact point 1008 is located proximate to the center of the square. This central contact point 1008 is electrically-isolated from the four corner contact points. Electrical leads or wiring connect to each of the corner contact points to a decoder logic circuit 1010 for determining the orientation of the planar gravity sensor 1000. An electrical lead or wire connected to the central contract point 1008 provides a reference point. When the liquid 1004 connects the central contract point 1008 with any of the corner contact points 1006*a-d*, a completed circuit is created.

FIG. 10 shows the planar gravity sensor 1000 in a first orientation with two of the corner contact points 1006*b-c* in contact with the liquid. FIG. 11 shows the planar gravity sensor 1000 rotated by approximately 45 degrees with three of the corner contact points 1006*a-c* in contact with the liquid 1004. By identifying the corner contact points 1006*a-d* in electrical contact with the central contact point 1008 via the liquid 1004, the relative orientation of the planar gravity sensor 1000 is determined with a resolution of approximately forty-five degrees (≈45°). Motion smoothing can be accomplished with viscosity selection. In another embodiment, two planar gravity sensors are used with one of the planar gravity sensors being offset from the other by approximately twenty-two and one-half degrees (≈22.5°) to provide resolution of approximately twenty-two and one-half degrees (≈22.5°). In a still further embodiment, resolution in three dimensions is accomplished using three sets of one or more planar gravity sensors positioned so that the planes are oriented mutually orthogonal to one another.

Figure 12:
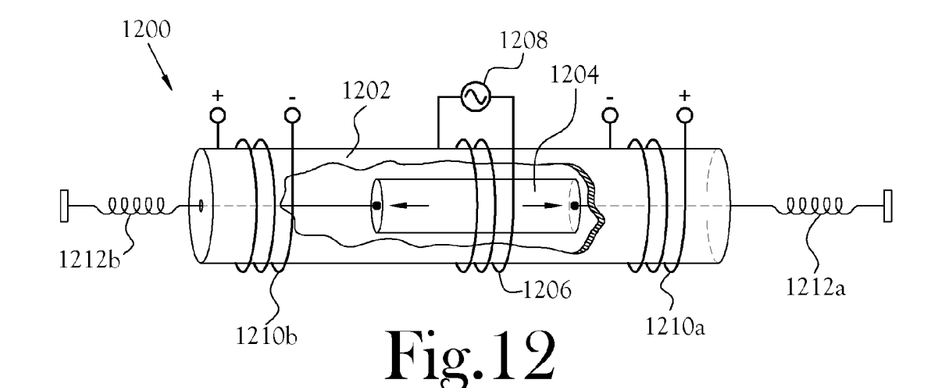
FIG. 12 is an illustration of a moving-core gravity sensor suitable for use with the present invention.

FIG. 12 shows an alternate embodiment for a gravity sensor 1200. The moving-core gravity sensor 1200 of FIG. 12 shows a generally cylindrical body 1202 cut away to reveal a cylindrical core 1204 housed within. A central winding 1206, driven by an alternating current source 1208, is wrapped around the central portion of the body 1202 and each end of the body 1202 is wrapped with a separate end winding 1210*a-b*. The two end windings 1210*a-b* are wound in opposite directions. A pair of springs 1212*a-b* cooperates to position the core 1204 at the central portion of the body 1202 when the body 1202 is oriented horizontally. The horizontal orientation of the body 1202 represents zero gravity. As the body 1202 moves from the horizontal orientation, the core 1204 moves towards the end of the body 1202 nearest the ground in response to gravity. The position of the core 1204 determines the coupling factor between the central winding 1206 and the end windings 1210*a-b*. The moving-core gravity sensor 1200 produces an output that is the gravity vector multiplied by the field intensity because coupling factor is a function of how well the core is aligned with gravity. As the core 1204 moves closer to either end of the body 1202, the coupling to the corresponding end winding 1210*a-b* increases. Because the end windings 1210*a-b* are wrapped in opposite directions, the resulting output also contains polarity information.

Another technique for determining collar orientation involves the use of an accelerometer capable of measuring static acceleration (e.g., gravity). One suitable device is the ADX202±2 g Dual Axis Accelerometer from Analog Devices, Inc. The ADX202 device uses capacitive "fingers" that move slightly under acceleration forces. The outputs of the ADX202 are duty cycle modulated signals that have duty cycles which are proportional the acceleration in each of the two sensitive axes. The outputs are directly readable by a processor without the need for further conversion.

The costs of the larger range for accurate polarity detection are monetary, temporal, and processing complexity. The addition of an orientation detector increases the monetary cost of the unit. Further, additional time is required to obtain and process the gravity vector from the orientation detector. Finally, incorporating the gravity vector into the polarity determination increases the complexity of the calculation. As the animal moves, the acceleration vectors change accordingly and a minimum time analysis window is required to determine the relative direction of the gravity vector. The polarity determination must consider each output of the orientation sensor in order to verify the measured magnetic field polarity.

Using an integrated circuit-based accelerometer makes it easier to produce a digital output and eliminates the need for a mechanical interface such as the sensors described above. However, any of the various techniques for determining collar orientation remain viable alternatives within a wide range of design specifications tempered by parameters such as size, weight, power consumption, cost, reliability, precision, and accuracy.

Upon receipt of the warning control signal generated by the ASIC, the microcontroller wakes from a sleep (low power) state and begins processing. The microcontroller reads multiple cycles from the orientation detector to determine the orientation of the receiver unit, the up/down result. The microcontroller also reads multiple cycles from the received signal from the ASIC to determine the signal polarity based upon the duty cycle, the positive/negative result. The up/down result and the positive/negative result are processed to determine an in/out result. For one embodiment, the in/out determination and result is summarized as a logical truth table:

TABLE

| In/Out Determination | | |
|---|---|---|
| Up/Down Result | Positive/Negative Result | In/Out Result |
| Up | Positive | In |
| Down | Positive | Out |
| Up | Negative | Out |
| Down | Negative | In |

If the in/out result is "in," meaning the animal is approaching the wire loop from inside the containment area, warnings/corrections are produced. If the in/out result is "out," meaning that the animal is approaching the wire loop from outside the containment area, warnings/corrections are not produced. Further, the receiver unit remains aware that the animal began approaching the wire loop from the outside and suppresses the warnings and/or corrections until the animal has reentered the safe zone. In this manner, the animal is not discouraged or inhibited from return to the containment area.

Because the in/out determination allows warnings and corrections to be generated only when the animal approaches the wire loop from inside the containment area, the warning/correction scheme can be customized to provide for more effective training. In one embodiment, the warning/correction scheme implements a triggered duration. If the animal moves from the correction zone inside the containment area to the escape zone outside of the wire loop, the receiver unit continues to issue a correction for a selected time period. The length of the correction time period is selected to be sufficient to provide a correction for a significantly greater distance than the range of a prior art containment signal. The maximum length of the correction time period is limited only by humane considerations and battery life. For example, returning again to the example of an animal moving at twenty miles per hour (20 mph), a correction time period of eight seconds (8 sec.) extends the effective width of the correction area to approximately two-hundred thirty-two feet (~232 ft) beyond the wire loop. When compared to the maximum width of the correction area outside the wire loop of a prior art electronic animal containment system, the effective width is over fifteen times (15×) greater. Obviously, the effective width is tied to the movement speed of the animal. For a slower moving animal, the end result of a larger effective correction area remains the same but the actual dimensions will vary. FIG. 13 illustrates the basic concept where the warning and correction zones are only present inside the containment area relative to the presence of the magnetic field but the correction zone extends outside the containment area as timed function independent of the presence of the magnetic field that occurs only in the direction of escape.

Triggered duration warning/correction schemes are not practicable with prior art electronic animal containment systems. Without knowing whether the animal has actually left the containment area, initiating a timed correction period could needlessly correct an animal that returns to the safe zone. This unwanted correction unfairly punishes the animal and is unproductive to effective training.

The receiver unit 118 of the direction-sensitive animal containment system 100 operates on substantially similar power requirements as receiver units of standard electronic animal containment systems. The added circuitry in the receiver unit 118 of the direction-sensitive animal containment system 100 has been calculated to be less than two and one-half milliamps (2.5 mA) when active and less than ten microamps (10 µA) when sleeping. Using an orientation detector 724 adds approximately six-tenths to one milliamp (0.6 to 1 mA) during the active time.

A direction-sensitive animal containment system has been shown and described. The resulting direction-sensitive containment system produces an asymmetric containment signal. Because the rise time of the containment signal pulse does not equal the fall time of the containment signal pulse, the signal received by the receiver unit has an uneven duty cycle. Thus, by knowing the direction of the current flow from the transmitter, the polarity of the received signal is determined by evaluating the duty cycle. Where the vertical rotation of the received unit can be constrained to approximately ninety degrees (90°), a single sensing coil is used. The addition of a second sensing coil extends the detection range to approximately one-hundred eighty degrees (180°). Adding an orientation detector allows the actual orientation of the receiver unit to be determined thereby increasing the sensitivity range up to a full three-hundred sixty degrees (360°). Warnings and/or corrections are only issued when the animal approaches the wire loop from inside the containment area. Should the animal escape from the containment area and later attempt to reenter the safe zone, warnings and/or corrections are suppressed so as to not discourage the animal's return. Customized warning/correction schemes are available that allow warnings and/or corrections to continue to be applied to an animal that leaves the containment area even when out of range of the containment signal.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

Having thus described the aforementioned invention, what is claimed is:

1. A direction-sensitive electronic animal containment system comprising:
    a wire loop bounding a selected area, said wire loop defining a safe zone, a correction zone, and an escape zone, said safe zone and said correction zone located within the selected area, said escape zone located outside the selected area;
    a containment signal generator in communication with said wire loop, said containment signal generator generating a containment signal current in said wire loop, said containment signal current comprising a waveform having a rising slope and a falling slope, the absolute value of said rising slope not equal to the absolute value of said falling slope;
    a receiver unit determining a direction of approach based on at least one of said rising slope and said falling slope, said receiver unit correcting an animal when the direction of approach indicates the animal is entering said correction zone from said safe zone, said receiver unit allowing the animal to pass without correction when the direction of approach indicates the animal is entering said correction zone from said escape zone, wherein said receiver unit generates a received signal comprising a first pulse having a width and direction corresponding to one of said rising slope and said falling slope and a second pulse having a width and direction corresponding to the other of said rising slope and said falling slope, said direction of approach being determined from the width of said first pulse relative to the width of said second pulse.

2. The direction-sensitive electronic animal containment system of claim 1 wherein said receiver unit corrects the animal for a selected time when the animal enters said escape zone from said correction zone.

3. The direction-sensitive electronic animal containment system of claim 1 wherein said receiver unit determines a duty cycle corresponding to the relative widths of said rising slope and said falling slope.

4. The direction-sensitive electronic animal containment system of claim 3 wherein said duty cycle is uneven, said uneven duty cycle having a first ratio in said correction zone and a second ratio in said escape zone, said first ratio being different from said second ratio, said receiver unit determining that the animal is entering said correction zone from said safe zone when said first ratio is detected without detecting said second ratio, said receiver unit determining that the animal is entering said escape zone from said correction zone when detection of said first ratio is followed by detection of said second ratio, said receiver unit determining that the animal is entering said correction zone from said escape zone when detection of said second ratio is followed by detection of said first ratio.

5. The direction-sensitive electronic animal containment system of claim 1 wherein said containment signal current waveform is an asymmetrical triangular waveform.

6. The direction-sensitive electronic animal containment system of claim 1 wherein said receiver unit further comprises an orientation detector providing orientation information about the orientation of said receiver unit allowing determination of said direction of approach corrected for the orientation of said receiver.

7. The direction-sensitive electronic animal containment system of claim 6 wherein orientation information is used to determine the direction of said first pulse and said second pulses.

8. The direction-sensitive electronic animal containment system of claim 1 wherein said waveform is a carrier waveform.

9. The direction-sensitive electronic animal containment system of claim 1 wherein said direction of approach is a first direction when the absolute value of said first pulse is greater than the absolute value of said second pulse and a second direction when the absolute value of said first pulse is less than the absolute value of said second pulse.

10. A direction-sensitive electronic animal containment system comprising:
- a containment signal generator generating a containment signal having an asymmetric carrier current comprising a rising slope and a falling slope corresponding to a rate of change, the absolute value of said rising slope not equal to the absolute value of said falling slope;
- a wire loop in communication with said containment signal generator, said wire loop bounding a containment area where an animal is to be contained, said wire loop carrying said containment signal;
- a receiver responsive to said containment signal and producing a received signal corresponding to said containment signal, said received signal comprising first and second pulses, each of said first and second pulses having a width and a direction derived from the rate of change of said asymmetric carrier current;
- a processing circuit in communication with said receiver, said processing circuit responsive to said received signal, said processing circuit determining a direction of approach based on the width of at least a selected one of said first and second pulses having a selected direction, said processing circuit producing a stimulus control signal when said direction of approach indicates that the animal is approaching said wire loop from within said containment area, said processing circuit not producing a stimulus control signal when said direction of approach indicates that the animal is approaching the wire loop from outside of said containment area; and
- a stimulus delivery device in communication with said processing circuit, said stimulus delivery device producing a stimulus in response to said stimulus control signal, said stimulus delivery device adapted to deliver said stimulus to an animal.

11. The direction-sensitive electronic animal containment system of claim 10 wherein an orientation of said receiver is assumed, said direction of each of said first and second pulses being corrected based on said assumed orientation.

12. The direction-sensitive electronic animal containment system of claim 10 further comprising an orientation detector associated with said receiver, said orientation detector producing an orientation signal corresponding to the orientation of said receiver, said direction of each of said first and second pulses corrected based on said orientation signal.

13. The direction-sensitive electronic animal containment system of claim 10 further comprising an orientation sensor in communication with said processing circuit, said orientation sensor producing an orientation signal representing a gravity vector, said processing circuit processing said orientation signal and said received signal to determine said direction of each of said first and second pulses corrected relative to said gravity vector.

14. The direction-sensitive electronic animal containment system of claim 13 wherein processing circuit calculates a vector dot product of said orientation signal and said received signal to correct said direction of each of said first and second pulses relative to said gravity vector.

15. The direction-sensitive electronic animal containment system of claim 13 wherein said received signal has an uneven duty cycle resulting from said asymmetric carrier current of said containment signal.

16. The direction-sensitive electronic animal containment system of claim 10 wherein said receiver includes a first sensing coil and a second sensing coil, said first sensing coil being orthogonally oriented relative to said second sensing coil.

17. The direction-sensitive electronic animal containment system of claim 10 wherein said containment signal is a triangle wave, each triangle of said triangle wave having an asymmetric shape.

18. The direction-sensitive electronic animal containment system of claim 17 wherein each triangle of said triangle wave has a rising slope and a falling slope and the absolute value of said rising slope is not equal to the absolute value of said falling slope.

19. The direction-sensitive electronic animal containment system of claim 10 wherein said received signal is a waveform with an uneven duty cycle, said uneven duty cycle having a first ratio when received signal is received within said containment area, said uneven duty cycle having a second ratio when received signal is received outside of said containment area.

20. The direction-sensitive electronic animal containment system of claim 19 wherein said first ratio indicates a first direction of approach and said second ratio indicates a second direction of approach when said receiver is at a first orientation, and wherein said first ratio indicates said second direction of approach and said second ratio indicates said first direction of approach when said receiver is at a second orientation.

21. The direction-sensitive electronic animal containment system of claim 10 wherein said received signal is a waveform with an uneven duty cycle, said uneven duty cycle having a ratio resulting from said asymmetric carrier current and corresponding to a direction of a magnetic field of said containment signal surrounding said wire loop, said ratio has a first value when said receiver is located inside said wire loop at a first orientation and a second value when said receiver is located outside said wire loop at said first orientation.

22. The direction-sensitive electronic animal containment system of claim 21 wherein said ratio has said second value when said receiver is located inside said wire loop at a second orientation and said first value when said receiver is located outside said wire loop at said second orientation, said second orientation being different from said first orientation.

23. The direction-sensitive electronic animal containment system of claim 21 wherein said stimulus control signal is produced when said processing circuit determines said uneven duty signal has a first ratio while said receiver unit is at said selected orientation, said stimulus control signal is produced for a selected time period when said processing circuit determines said uneven duty signal transitions from a first ratio to a second ratio while said receiver unit is at said selected orientation, and said stimulus control signal is not produced when said processing circuit determines said uneven duty signal transitions from a second ratio to a first ratio while said receiver unit is at said selected orientation.

24. The direction-sensitive electronic animal containment system of claim 10 wherein said stimulus occurs for a selected time period when said processing circuit determines that the animal has crossed said wire loop from inside said containment area based on a change in said relative widths of said first and second pulses.

25. The direction-sensitive electronic animal containment system of claim 10 wherein said direction of approach is determined from said width of the one of said first and second pulses having a positive direction.

26. The direction-sensitive electronic animal containment system of claim 10 wherein said direction of approach is determined from a comparison of said width of said first pulse to said second pulse.

27. The direction-sensitive electronic animal containment system of claim 10 wherein said direction of approach is determined from a comparison of said width of the one of said first and second pulses having positive direction to said width of the other of said first and second pulses.

* * * * *